United States Patent [19]

Rohner

[11] E Patent Number: Re. 32,372

[45] Reissued Date of Patent: Mar. 17, 1987

[54] METHOD AND DEVICE FOR JOINING AN UPPER THREAD TO A LOWER THREAD

[75] Inventor: Joachim Rohner, Monchen-Gladbach, Fed. Rep. of Germany

[73] Assignee: W. Schlafhorst & Co., Monchen-Gladbach, Fed. Rep. of Germany

[21] Appl. No.: 777,941

[22] Filed: Sep. 18, 1985

Related U.S. Patent Documents

Reissue of:

[64] Patent No.: 4,408,442
Issued: Oct. 11, 1983
Appl. No.: 205,280
Filed: Nov. 10, 1980

[30] Foreign Application Priority Data

Nov. 10, 1979 [DE] Fed. Rep. of Germany ..... 2945504

[51] Int. Cl.[4] ..... D01H 15/00
[52] U.S. Cl. ..... 57/22; 57/261
[58] Field of Search ..... 57/22, 261

[56] References Cited

U.S. PATENT DOCUMENTS

| | | | |
|---|---|---|---|
| 4,217,749 | 8/1980 | Rohner et al. | 57/261 |
| 4,229,935 | 10/1980 | Wain | 57/22 |
| 4,232,509 | 11/1980 | Rohner et al. | 57/261 |
| 4,240,247 | 12/1980 | Matsui | 57/22 X |
| 4,263,775 | 4/1981 | Mima | 57/22 |
| 4,344,277 | 8/1982 | Rohner et al. | 57/22 |

*Primary Examiner*—Donald Watkins
*Attorney, Agent, or Firm*—Shefte, Pinckney & Sawyer

[57] ABSTRACT

Method for joining an upper thread with a lower thread, which includes moving at least one thread regulator from a thread receiving position to a thread delivery position, inserting the threads with the at least one thread regulator into a longitudinal groove formed in a splicing chamber, automatically admitting compressed air laterally into the splicing chamber for splicing the threads, automatically separating the ends of the upper and lower threads and blowing compressed air into the splicing chamber in dependence on the position of the at least one thread regulator, separating the threads to form new shorter thread ends, sucking up the newly-formed shorter thread ends with an air stream, and securing the newly-formed shorter thread ends and device for performing the method.

31 Claims, 5 Drawing Figures

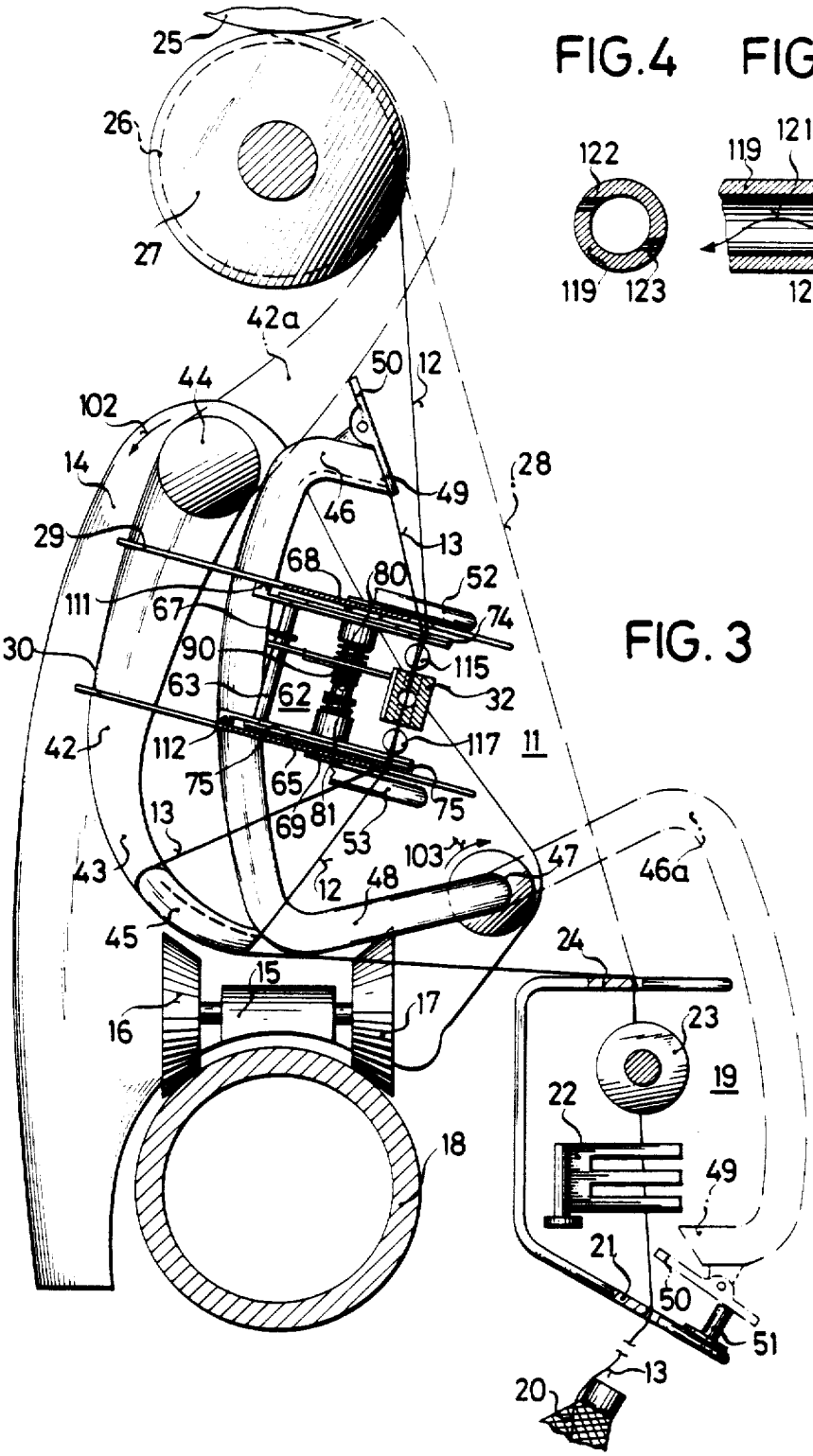
FIG. 3
FIG. 4
FIG. 5
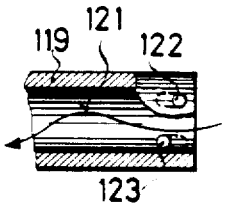

METHOD AND DEVICE FOR JOINING AN UPPER THREAD TO A LOWER THREAD

Matter enclosed in heavy brackets [ ] appears in the original patent but forms no part of this reissue specification; matter printed in italics indicates the additions made by reissue.

The invention relates to a method and a device for joining an upper thread to a lower thread by means of a device having a splicing chamber with a longitudinal groove for inserting and connecting the threads, possibly having a cover, the threads being spliced to each other by compressed air acting from the side, and joined to each other in this manner, whereby the insertion of the threads is effected by at least one movable thread regulator which is moved from a thread receiving position to a thread delivery position, and whereby, depending on the position of the thread regulator, the splicing chamber, if necessary, is closed by a cover, the ends of the upper and lower thread are automatically separated and compressed air is blown into the splicing chamber.

Up to the present the thread ends were held by mechanical means in devices of this type. Because of this, thread ends of different length and different strength of thread looping at the thread deflection points resulted in different thread tensions during the splicing process, or the thread ends were left to themselves after cutting, which means that they were able to shift, and uneven connections and faulty splice connections resulted. This also reduced the quality of the splice connections.

It is accordingly an object of the invention to provide a method and device for joining an upper thread to a lower thread, which overcomes the hereinafore-mentioned disadvantages of the heretofore-known methods and devices of this general type, and to increase the quality of splice connections, to enhance the reliability of the splicing process, and in particular to also improve the strength and appearance of the splice connection, and to extend the splicing of threads to finer threads.

With the foregoing and other objects in view there is provided, in accordance with the invention, a method for joining an upper thread with a lower thread, which comprises moving at least one thread regulator from a thread receiving position to a thread delivery position, inserting the threads with the at least one thread regulator into a longitudinal groove formed in a splicing chamber, automatically admitting compressed air laterally into the splicing chamber for splicing the threads, automatically separating the ends of the upper and lower threads and blowing compressed air into the splicing chamber in dependence on the position of the at least one thread regulator, separating the threads to form new shorter thread ends, sucking up the newly-formed shorter thread ends with an air stream, and securing the newly-formed shorter thread ends.

In accordance with another mode of the invention, there is provided a method which comprises closing the splicing chamber with a cover in dependence on the position of the at least one thread regulator.

In accordance with another mode of the invention, there is provided a method which comprises subjecting the thread ends to a swirling flow.

In accordance with an added mode of the invention, there is provided a method which comprises directing the swirling flow against the direction of twist of the thread.

In accordance with an additional mode of the invention, there is provided a method which comprises adjusting at least one of the strength and duration of influence of the air stream with respect to the strength, type and property of the threads to be joined.

With the foregoing and other objects in view there is also provided a device for performing the method of joining an upper thread with a lower thread comprising a splicing chamber having a longitudinal groove formed therein for receiving and connecting the threads, an openable cover covering the groove, a compressed air channel connected to the splicing chamber, at least one thread regulator being movable from a thread receiving to a thread delivery position for inserting the threads into the groove, thread cutting means for separating ends of the upper and lower threads to form shortened thread ends of the upper and lower threads, a controllable and adjustable metering valve connected to the compressed air channel, each of the cover, thread cutting means and metering valve being controllable in dependence on the position of the at least one thread regulator, first pneumatic means disposed above the splicing chambers for receiving the shortened thread end of the lower thread, and second pneumatic means disposed below the splicing chamber for receiving the shortened thread end of the upper thread.

In accordance with another feature of the invention, the pneumatic means include thread suck-in nozzles for receiving the threads.

In accordance with a further feature of the invention, there is provided a common collecting line connected to the thread suck-in nozzles.

In accordance with an added feature of the invention, the thread cutting means are in the form of a thread cutting mechanism for each of the pneumatic means, and each of the thread suck-in nozzles or receiving elements are disposed between the splicing chamber and one of the thread cutting mechanisms.

In accordance with an additional feature of the invention, the thread suck-in nozzles or receiving elements are in the form of swirl nozzles.

In accordance with yet another feature of the invention, the swirl nozzles include swirl elements directed against the direction of twist of the thread.

In accordance with yet a further feature of the invention, there is provided controllable or adjustable means for metering air suction being connected to the pneumatic means.

In accordance with a concomitant feature of the invention, there is provided a fixed or an adjustable proximity switch for controlling the air suction metering means in response to motion of the at least one thread regulator, and a timing circuit for simultaneously controlling and setting the air suction metering means.

The advantages achieved by the invention lie especially in improving the quality of the splice connection by yieldingly holding the previously shortened thread ends with moderate force, so that still more thread lengths can be fed into the splicing chamber, thus resulting in a better splice connection. If the thread ends are additionally exposed to a swirl flow according to the invention, excessive fibers are separated from the splice connection and are pneumatically removed. This improves the quality of the splice connection still more with respect to the workability of the threads and the appearance of the thread connection..

The advantages of the whole device which will be explained in a typical embodiment hereinbelow, are especially that all accidental factors and uncertainties are removed from the taking-up of single threads.

Beyond this, the whole work process of thread joining has been automated, beginning with locating the threads at the means for delivering the lower thread, and at the elements taking-up and guiding the upper thread.

All working steps are tuned to each other. The moment in time and the duration of each important step is adjustable, especially the point in time at which air is blown in, when the excessive thread ends are cut, and the shortened thread ends are sucked-in by the pneumatic means.

The device for joining the upper thread to the lower thread can advantageously be made as a device which can travel from work station to work station.

In some circumstances a single, preferably two-armed, hingeable thread regulator is sufficient for inserting the threads to be joined into the longitudinal groove of the splicing chamber. If the threads must be located in the delivery or receiving regions, at least two hingeable thread regulators are required. It has been proven to be particularly advantageous for the last mentioned case to include still a third thread regulator, which takes the threads from the two firstly-mentioned thread regulators, and transports them into the chamber by swinging sideward, whereby the threads can be simultaneously crossed.

Other features which are considered as characteristic for the invention are set forth in the appended claims.

Although the invention is illustrated and described herein as embodied in a method and device for joining an upper thread to a lower thread, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 3 is a diagrammatic simplified side elevational and partly cross-sectional view of the device; and FIGS. 4 and 5 are diagrammatic cross-sectional and longitudinal-sectional views of a thread suck-in nozzle, respectively.

Figure 1:
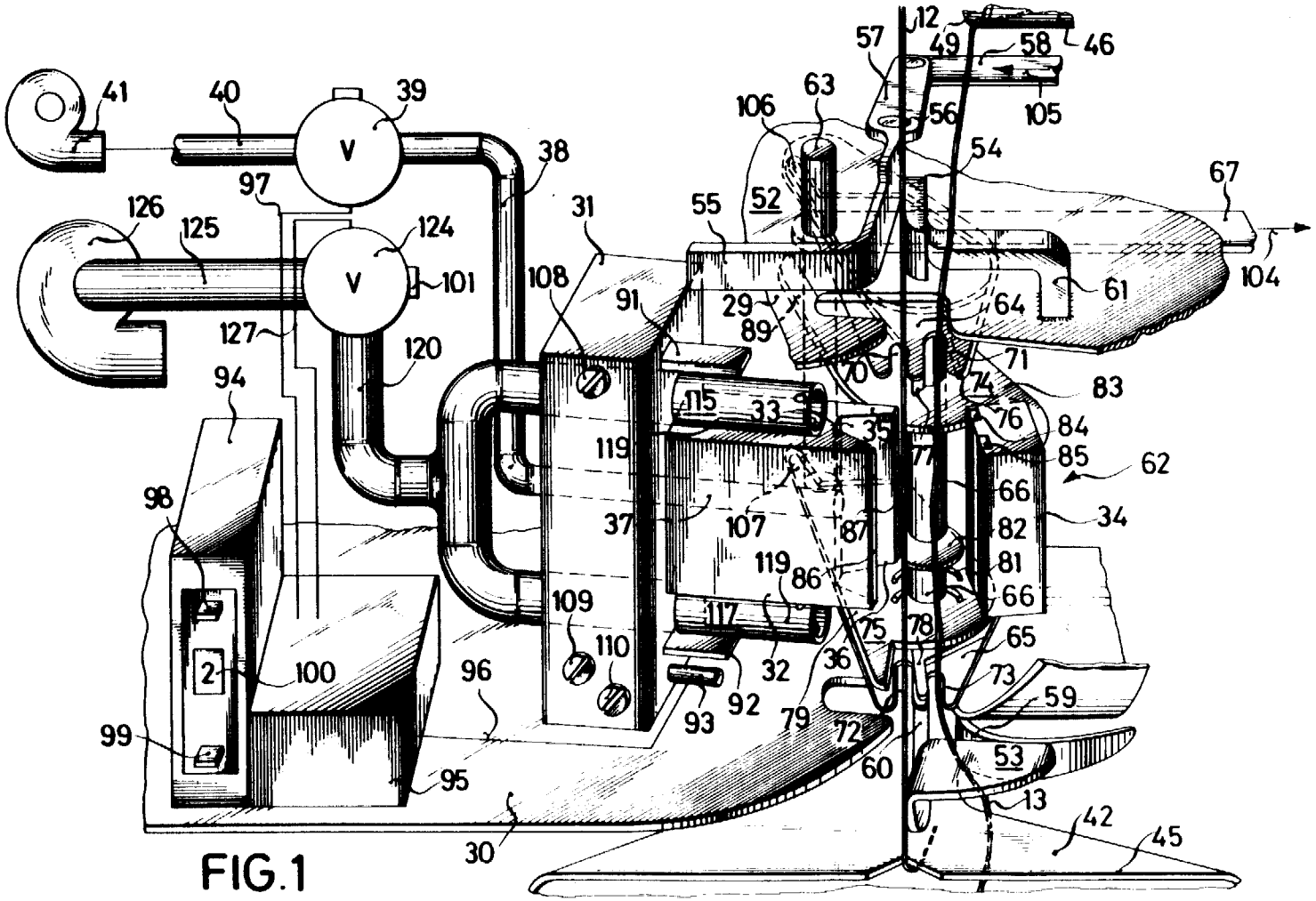
FIG. 1 is a diagrammatic perspective view and a schematic block diagram of the device according to the invention with the splicing chamber opened.

Referring now particularly to all of the figures of the drawing as a whole, there is seen a device, as a whole designated with reference numeral 11, for joining an upper thread 12 to a lower thread 13. The device 11 has a machine frame 14 which carries a movable carriage 15, according to FIG. 3. The carriage 15 is provided with rollers 16 and 17, and the device 11 translates by means of the rollers on a carrier tube 18.

The carrier tube 18 is disposed alongside of a winding frame, according to FIG. 3. Only one pirning head or spool or winding station 19 of the carrier tube 18 is shown. The device 11 operates at this spool station 19. At the spool station 19, the lower thread 13 comes to the device 11 from a creel bobbin 20, over a thread guide 21, a comb feeler 22, a thread brake 23 and another thread guide 24. The upper thread 12 comes to the device 11 from a take-up reel 25, over a rotating thread-guiding drum 27 which is provided with reverse threaded grooves 26.

In a way, the arrangement supplying the lower thread 13 includes the thread guide 21 and the mechanism which receives the upperthread from the take-up reel 25. The line giving the shortest possible, uninfluenced and undisturbed path for the thread is designated with reference numeral 28.

The fact that the line 28 is shown in dots and dashes indicates that the path of the thread has already been disturbed and that the thread itself is already separated into an upper and lower thread.

Figure 2:
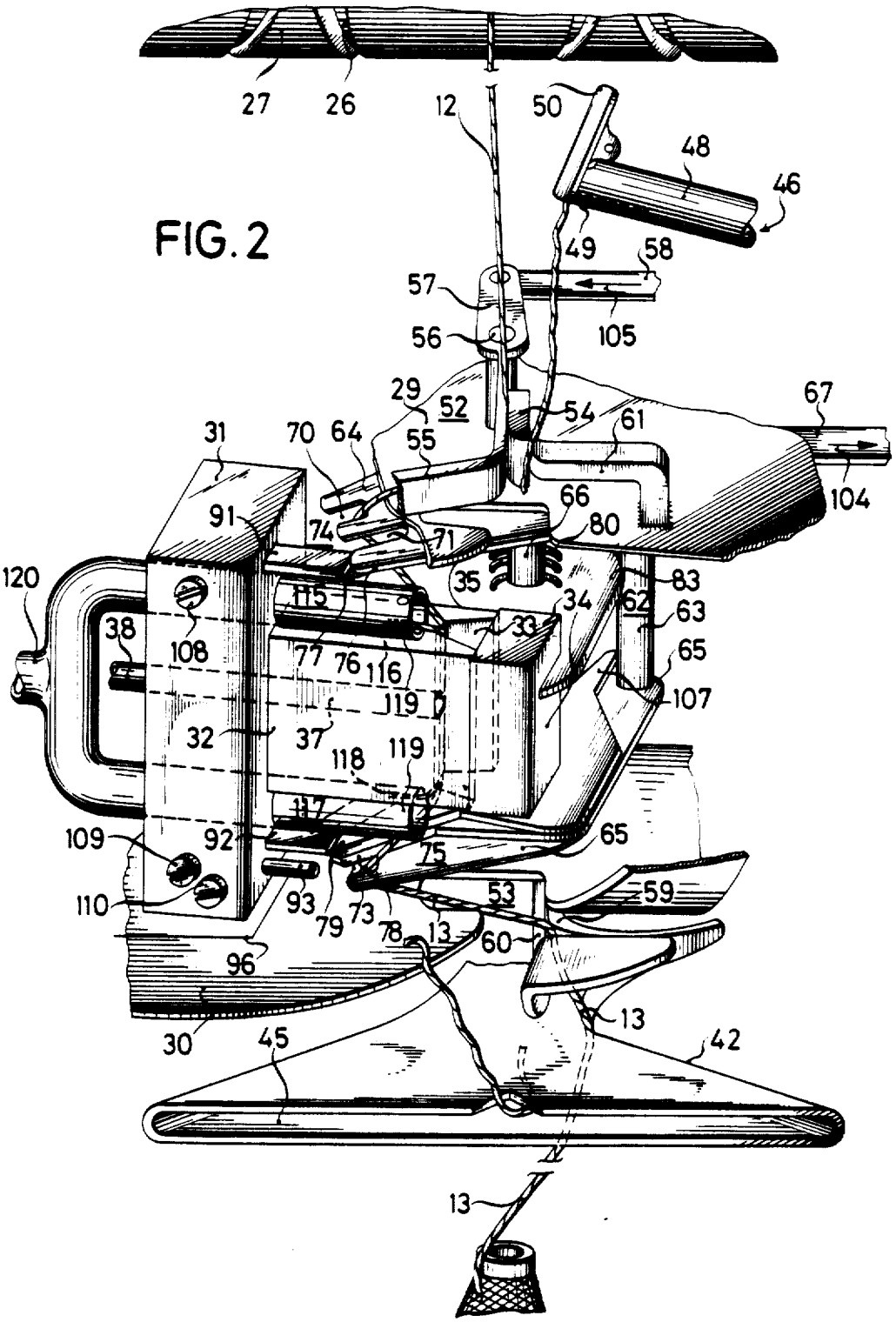
FIG. 2 is a perspective view of the device according to the invention which is similar to FIG. 1, but with the splicing chamber closed.

The device 11 is provided with two plates 29, 30 which are fastened to the machine frame 14, and connected to each other by a carrier 31, which is best seen in FIGS. 2 and 3. A splicing chamber 32 is fastened to the carrier 31. The splicing chamber 32 has a longitudinal groove 33, which can be closed by a cover 34. When the cover is open, the threads can be inserted into the longitudinal groove of the splicing chamber. The end-edges 35, 36 of the longitudinal groove 33, formed on the chamber 32 are rounded. A channel 37 for compressed air continues as a tube-line 38 leading to a metering valve 39 for compressed air as shown in FIG. 1. The metering valve 39 is connected to a blower 41 by a tube line 40.

A thread regulator 42 is provided with means for locating and holding the thread end of the upper thread 12 on the take-up reel 25. These means include an arm 43 with a hollow inside which, as shown in FIG. 3, is connected by a pivot joint 44 to a source of negative pressure that is not shown, and a suction-slot nozzle 45 best seen in FIGS. 1 and 2. FIG. 3 shows the thread regulator 42 in the thread delivery position. Its thread-receiving position is designated by reference symbol 42a, and shown with dots and dashes in FIG. 3.

Another hingeable thread regulator 46 is provided with means for locating and holding the thread ends of the lower thread 13. These means include a curved tube 48, which can rotate in the pivot joint 47 and has a suction nozzle 49 which is closed by a cover 50 retained by spring action. The thread regulator 46 is also shown in the thread delivery position in FIG. 3. Its thread receiving position is designated by reference symbol 46a, and shown with dots and dashes in FIG. 3. The cover 50 is opened by hitting a stop 51 for receiving the thread end of the lower thread 13. Now, the lower thread 13 which is broken approximately above the thread brake 23, can be sucked-in by the suction nozzle 49, and in the thread delivery position, the lower thread 13 can be clamped between the cover 50 and the edge of the suction nozzle 49 and be held and carried along when the thread regulator swings back.

The drawings also show two controllable thread clamping devices 52, 53. The thread clamping device 52 is disposed above the splicing chamber 32 and also above the plate 29; the thread-clamping device 53 is disposed below the splicing chamber 32, and also below the plate 30. Each of the two thread clamping devices is constructed in two parts. The thread clamping device 52 has a fixed clamping piece 54, and a controllable clamp 55 which hinges on a pivot joint 56, and has a lever 57 which can be controlled by a rod 58 through a cam disc which is not shown. The thread clamping device 53 has a fixed clamping piece 59 and a controllable clamp 60 which in the same manner as the clamping device 52, is controllable by a non-illustrated cam disc. The clamping piece 54 is connected to the plate 29 by a bracket 61. The clamping piece 59 is connected with the plate 30.

It can also be recognized in the drawings that there is a hingeable, two-armed thread regulator 62, including a rod 63 with arms 64, 65 fastened to the rod 63. The thread regulator 62 is rotatably supported on an axis or axle 66, which connects the plate 29 with the plate 30. A rod 67 is articulatingly connected with the rod 63 for swinging the thread regulator 62 around axis 66.

Spacer discs 68, 69, seen best in FIG. 3, serve for centralizing the thread regulator 62. The thread regulator 62 can be made to swing from the thread-receiving position shown in FIG. 1 to the thread delivery position shown in FIG. 2. The plane in which the arm 64 swings lies above, and the swing-plane of arm 65 lies below, the chamber 32. In the thread receiving position both arms of the thread regulator 62 lie in the thread paths of the threads 12, 13, which lie parallel after the swinging of the thread regulators 42 and 46.

Each arm of the threaded regulator 62 has two adjacent thread-receiving slots of uneven depth. The drawings of FIG. 1 and FIG. 2 show that the thread receiving slot 71 of arm 64 is deeper than the thread receiving slot 70. Similarly the thread receiving slot 72 of arm 65 is deeper than thread receiving slot 73. These unequally deep thread receiving slots are disposed in such a way that the less deep thread receiving slot of the arm is aligned above the deeper thread receiving slot of the other arm. In the thread receiving position of thread regulator 62, the thread receiving slots lie approximately in the swing-plane of the thread regulator 42 and 46.

Each arm of the thread regulator 62 has a controllable thread cutting mechanism. The thread cutting mechanism 74 is associated with the arm 64, and thread mechanism 74 is associated with arm 65. Each thread cutting mechanism includes two scissor-like knives which work together. One knife is always connected with the associated arm, and the other knife, which is always the one disposed nearer to the chamber 32, can swing around axis 66. For example, the knife 76 of the thread cutting mechanism 74 is connected to the arm 64, while the knife 77 of the same thread-cutting mechanism is hingeably supported. The knife 78 of the thread cutting mechanism 75 is connected to the arm 65, while the knife 79 of the same thread cutting mechanism is hingeably supported. FIG. 2 shows especially clearly that the knife 77 is pressed against the knife 76 by a spiral spring 80. FIG. 1 shows that the knife 79 is also pressed by a spiral spring 81 against the knife 78. The spiral spring 81 butts against a disc 82 which is fastened on the axis 66. The spiral spring 80 banks against a swing-arm 83 which is rotatable on the axis 66, and carries the cover 34 of the chamber 32. The cover 34 has inserts 84, 85 made of sealing material, which lies against the edges 86, 87 of the longitudinal groove when closing the cover, and thereby prevent compressed air and single fibers or threads from escaping from the chamber 32 sideward. The thread regulator 62, the thread cutting devices 74, 75 and the swing-arm 83 of the cover 34 not only have a common hinge-axis 66, but can also swing together. For this purpose, the rear end of the swinging arm 83 carries a lever 89 which lies against the rod 63 by the action of a wound bending spring 90 shown in FIG. 3. While the two knives 76 and 78 are connected to the arms 64 and 65 respectively, the hingeable knives 77 and 79 are also taken along when the thread regulator 62 swings by the action of the spiral springs 80, 81. This taking-along of the knives 76 and 78 is limited by the adjustable stops 91, 92. The adjustment capability is provided by the clamping screws 108 and 109. The timed separation of the thread ends can therefore be very axactly set, and tuned to the point in time when the compressed air is let in, or can be tuned to the blow time. When the thread-regulator 62 is moved to the position shown in FIG. 2, the thread-cutting mechanisms 74 and 75 close, whereby the lever 106 of the knife 77, and a similar lever 107 of the knife 79 lift themselves from the rod 63. At that point the thread cutting mechanisms are closed like scissors. When the thread regulator 62 swings back into the thread-receiving position, the rod 63 positions itself against the levers 106 and 107, whereby the thread cutting mechanisms are again opened scissor-like as the swinging motion continues. The thread cutting mechanisms 74 and 75 are disposed in such a way that they always operate at the thread receiving slots in which the thread ends wich are to be cut, lie, i.e. at the thread receiving slot 71 of the arm 64, and at the thread receiving slot 72 of the arm 65. FIG. 2 shows that the thread receiving slots of the thread regulator 62 are disposed in the thread delivery position shown, obliquely above and below, respectively, and behind the end-edges 35, 36 of the chamber 32, so that the threads surround the end-edges.

The compressed air metering valve 39 can be controlled by a proximity switch 93 which responds to the motion of the thread regulator 62 and can be adjusted in its position on the carrier 31 by a clamp-screw 110. The metering valve can also be set by means of a timing circuit 94, and controlled thereby. For this purpose, the parts 39, 93 and 94 are connected to a switchbox 95 which houses a standard electrical switching arrangement. The adjustability of the proximity switch 93 assures the exact setting of the beginning of the blowing of air in dependence on the position of the thread cutting mechanisms, and the timing for separating the thread ends. FIG. 1 shows the line 96 which leads to the proximity switch 93, and the line 97 leading to the compressed air metering valve 39. The timing circuit 94 is provided with a switch 98 for setting the blower time and a display 100 for indicating the blow-time. The compressed air metering valve 39 has means 101 for setting the pressure.

The drawing of FIG. 1 and FIG. 2 shows that several parts of the device 11 have special thread-guiding contours. This is the case, for example, at the suction slit nozzle 45, at the thread clamping devices 52 and 53 and at the plates 29 and 30.

Just above the splicing chamber 32, there are seen pneumatic means 115 for receiving the shortened thread ends 116 of the lower thread 13, and just below the splicing chamber 32, there are seen pneumatic means 117 for receiving the shortened thread end 118 of the upper thread 12. Both pneumatic means have similar thread suck-in nozzles 119, which are shown separately in cross section and in longitudinal section in FIG. 4 and FIG. 5. Both thread suck in nozzles end in a common line 120. The thread suction nozzles 119 serve as thread receiving elements.

FIG. 4 and FIG. 5 show that the thread suck-in nozzles 119 are made in the form of a swirl nozzle. For this purpose, in the vicinity of the end of the nozzles there are provided twisting elements in the form of two tangential holes 122, 123 which are also directed in the direction of the arrow 121. Air flowing in the direction of the arrow 121 simultaneously draws along air flowing into the holes 122 and 123, causing a swirling flow in the pneumatic means. The holes are directed against the twist or rotation of the thread. When changing to a lot with threads having another twist, the thread suction nozzles are changed. For this purpose, they are mounted into the carrier 31 so that they can be easily exchanged.

The collecting line 120 leads to a suction-air metering element in the form of a suction-air metering valve 124, from which a line 125 leads to an exhaust 126. The suction-air metering valve 124 can also be controlled by the proximity switch 93, and can be set and controlled by the timing circuit 94. FIG. 1 shows the line 127 which leads from the switch box 95 to the suction-air metering valve 124, and a switch 99 disposed at the time circuit device 94 for setting the suction time.

The functioning of the device according to the invention will now be explained, using the example of a thread joining operation.

First, let us assume that at a pirning head or winding station 19 of a spinning machine the thread which was previously conducted along the line 28 is broken. Thus, an upper thread 12 and a lower thread 13 are created. The upper thread 12 was taken up by the take-up reel 25; the lower thread 13 is secured by the thread brake 23 in conjunction with the comb-feeler 22.

The thread breakage has been diagnosed in the known manner by non-illustrated means, and the travelling device 11 has been alerted. According to FIG. 3, the device 11 is moved on the carrier tube 18 in front of the pirning head 19. The thread regulators 42 and 46 are in the rest position, which is identical with the thread delivery position, if it can be visualized that the threads shown in FIG. 3 are not there. The third thread regulator 62 stands in the thread receiving position, as shown in FIG. 1. The threads shown in the figures should be first considered as not being present. Now the device 11 works in the following manner:

A non-illustrated control drive in the machine frame 14 which starts automatically on the signal caused by the pirning head 19, turns the pivot joint 44 of the thread regulator 42 in the direction of the arrow 102, until the thread regulator has reached the thread receiving position 42a. In this position, the suction slit nozzle 45 is disposed closely before the surface of the take-up reel 25. The suction slit nozzle extends over the whole width of the take-up reel 25. The thread end of the upper thread 12 is located by the negative pressure in the suction slot nozzle 45, sucked in and held fixed, while the take-up reel 25 slowly rotates, and runs out, respectively. Simultaneously the control drive turns the pivot joint 47 of the thread regulator 46 in the direction of the arrow 103 until the thread regulator 46 has reached the thread receiving position 46a. Here the clamping cover 50 hits against the stop 51, and thereby opens. Now the effective negative pressure at the suction nozzle 49 can suck-in the thread end of the lower thread 13 and hold it securely.

After a predetermined, short operating time, the control drive rotates the two pivot joints 44 and 47 back to the starting position. In this way, both thread regulators 42 and 46 simultaneously swing back to the thread delivery positions shown in FIG. 3 with solid lines. During the swinging motion of the thread regulator 46, the clamp-cover 50 closes again, and keeps the thread end clamped.

During the back swing of the thread regulators 42 and 46 from the position shown in FIG. 3 with dots and dashes into the position shown with solid lines, the threads move into the thread receiving slots of the thread regulators 62, as is also shown in FIG. 1. The above-mentioned thread guiding contours see to it that the upper thread 12 coming from the take-up reel 25 is laid between clamp-piece 54 and clamp 55 of the thread clamping devices 52 into the thread receiving slots 70 and 72 of the thread regulator 62. The lower thread 13 which comes from the creel bobbin 20 through the thread guide 21, is laid into the comb feeler 22, the thread brake 23, and the thread guide 24, led over the rear side of the suction-slot nozzle 45 of the thread regulator 42, conducted between clamp-piece 59 and clamp 60 of the thread clamping device 53, and inserted into the thread receiving slots 73 and 71 of the thread regulator 62. Because both thread regulators 42 and 46 swing back at the same time, the round rear side of the suction-slot nozzle 45 takes along the lower thread 13, and steers it out, as shown in FIG. 1. During the swing-motion of the thread regulators 42 and 46, the thread clamping devices 52 and 53 are open.

At this moment, a control drive which is not shown in the drawing, activates two cam discs (also not shown) which see to it that the rod 67 is pulled in the direction of the arrow 104, and the rod 58 is pulled in the direction of the arrow 105, out of the positions shown in FIG. 1. During the motion of the rod 67, the two arms of the thread regulator 62 and the swing arm 83 of the cover 34 swing to the left. Due to the unequal depth of the thread receiving slots, the threads are inserted into the longitudinal groove 33 of the splicing chamber 32 crossing each other. The two thread cutting mechanisms are still open. Shortly before reaching the end position shown in FIG. 2, which is equivalent to the thread delivery position for the thread regulator 62, the cover 34 with its inserts 84,85 positions itself against the edges 86 and 87 of the longitudinal groove 33 of the splicing chamber 32. Simultaneously, the two thread [cutting] *clamping* mechanisms 52, 53 close, while the knives 77 and 79 hit against the stops 91, 92, respectively. In the same instant the proximity switch 93 senses the approaching arm 65 of the thread regulator 62. The proximity switch 93 initiates by the electrical circuitry in the switchbox 95, the operation of the compressed air metering valve 39 and the suction air metering valve 124 for the flow and suction times, respectively, set at the timing circuit device 94. During the blow-time, approximately two seconds, the two arms of the thread regulator 62 swing further to the left, so that they finally reach the end position shown in FIG. 2. Meanwhile, the thread cutting mechanisms are operating, and the excessive thread ends are separated (cut) and are sucked off and held fixed by the clamping cover 50, respectively, while the two newly-created thread-ends 116 and 118 are sucked up and held fixed by the pneumatic means 115 and 117. This also assures a tightening of the threads if the splicing operation requires it.

From the end position shown in FIG. 2, the thread regulator 62 is brought again to its basic position without delay, and the thread clamping devices are opened by the cam discs which move the rod 67 against the direction of arrow 104 and the rod 58 against the direction of arrow 105. During the beginning of this backward motion, the thread cutting mechanisms remain closed for a limited time, i.e. until the rod 63 has reached the two levers 106 and 107, and only thereafter can the thread cutting mechanisms be opened. The cover 34 is also opened with a time delay, again from the moment on when the rod 63 has reached the lever 89 of the swing arm 83. Depending on the strength of the springs 80, 81 and 90, the return position of the thread cutting mechanisms and the complete opening of the cover 34 is only reached when the rod 63 is moved back by the rod 67 as far as is shown in FIG. 1. The backs of the levers 106 and 107 lie against the stops 111, 112 at that time. The point in time when the splicing takes place can be chosen to be before or after the cutting of the thread ends.

At the end of the hereinafore-described working steps, the thread which is connected by splicing with compressed air finally lies in the open thread clamping device 75, in the thread receiving slot 73 of the arm 65, before the open splicing chamber 32, in the thread receiving slot 70 of the arm 64 and in the open thread clamping device 52. The suction air metering valve 124 remains open until this point in time. The swirling flc·v in the thread suck-in nozzles 119 affects the thread ends 116 and 118 throughout this time, dissolves them to single fibers, and transports the dissolved (separated) individual fibers away, if they are not tied into the spliced portion. After splicing, only short ends including individual fibers are at the spliced spot.

Subsequently when the pirning station 19 starts operating again, the thread jumps out of the device 11 due to the resumed winding tension, and assumes the thread path according to the line 28 in FIG. 3. Now the activity of device 11 is ended, and it can travel to another position to be used. The thread is thereby again located outside the travel range of the device 11.

The invention is not limited to the illustrated and described typical embodiment. For example, by a minor construction change, the thread regulator can be omitted. For this purpose, the splicing chamber 32 would have to be rotated, so that one could look into the longitudinal groove 33 from the front. Then the thread regulators 42 and 46 can insert the thread into the longitudinal groove 33. The rod 67 is then only required for opening and closing the cover 34, and for operating the thread cutting mechanisms. But this simplified embodiment of the invention entails possible difficulties when crossing the threads, so that disposition of a third thread regulator 62 in connection with the thread cutting mechanisms seemed more advantageous.

The concepts lower thread and upper thread are not tied to the concepts "up" and "down". In this connection, in general, a thread is called a lower thread when it comes from a point which delivers the thread, for example from a creel bobbin, or from a thread generating device. The upper thread is the thread which leads to a thread receiving point, for example to a takepup coil, or a winding beam. The direction of the thread can therefore be from below and upward, as is the case in the illustrated sample embodiment. But the thread can also be directed in the opposite direction, or may have any direction in space. Its path may be in a horizontal direction, for example. Though the illustrated example relates to a device for joining threads with the capability of travel, a device according to the invention can obviously be also disposed at each work station. Besides being used at pirn winders, the device according to the invention can also be used at spinning machines, spinning creels, tufting machines and the like, for example.

In the embodiment used as an example, the threads were crossed in the preparation before joining the threads. However, it can also be advantageous to insert the threads in an uncrossed state into the splice chamber.

The arrangement using an air suction metering element is not absolutely necessary. However, if such an element is missing, the continuous flow of suction air can become a source of trouble because dust particles from the surrounding air are continuously sucked up and can clog the thread suck-in nozzles, together with fibers and thread ends.

It proved to be advantageous to close the splicing chamber during the splicing operation by the use of a cover. However, the closing of the splicing chamber is not absolutely necessary. By a special configuration of the insertion slot, and by special air controls, splicing is also possible if the splicing chamber is open at the insertion side.

The air flow required according to the invention can be produced in another embodiment by compressed air instead of air suction. For example, it can be done in such a manner that an air jet is directed against the ends of the thread suck-in nozzles.

There are claimed:

1. Method for joining an upper thread with a lower thread, which comprises [moving at least one thread regulator from a thread receiving position to a thread delivery position,] inserting the threads [with the at least one thread regulator] into a longitudinal groove formed in a splicing chamber, [automatically admitting compressed air laterally into the splicing chamber for splicing the threads, automatically separating] *cutting* the ends of the upper and lower threads [and] *to form new shorter thread ends,* blowing compressed air *laterally* into the splicing chamber [in dependence on the position of the at least one thread regulator, separating the threads to form new shorter thread ends,] *for splicing the threads,* sucking up and securing the newly-formed shorter thread ends with an air stream above and below said splicing chamber, [interchanging] *selectively disposing exchangable* twisting nozzles above and below the splicing chamber for directing the air stream along the newly-formed shorter thread ends in the form of a twisting flow above and below the splicing chamber against the direction of twist of the particular threads being joined, and coordinating the strength and duration of the air stream with the strength, type and condition of the threads to be joined together.

2. Method according to claim 1, which comprises closing the splicing chamber with a cover [in dependence on the position of the at least one thread regulator].

3. Device for [performing the method of] joining an upper thread with a lower thread [according to claim 1], comprising a splicing chamber having a longitudinal groove formed therein for receiving and connecting the threads, [an openable cover covering said groove,] a compressed air channel connected to said splicing chamber, at least one thread regulator [being movable from a thread receiving to a thread delivery position] for inserting the threads into said groove, thread cutting means for separating ends of the upper and lower threads to form shortened thread ends of the upper and lower threads, a controllable and adjustable metering valve connected to said compressed air channel, [each of said cover, thread cutting means and metering valve being controllable in dependence on the position of said at least one thread regulator,] first pneumatic means disposed above said splicing chamber in the form of a first interchangeable twisting nozzle for receiving said shortened thread end of the lower thread, *said first twisting nozzle* having first twisting [elements directed] *means for directing an air stream* against the direction of twist of the lower thread, second pneumatic means disposed below said splicing chamber in the form of a second interchangeable twisting nozzle for receiving said shortened thread end of the upper thread, *said second twisting nozzle* having second twisting [elements directed] *means for directing another air stream* against the direction of twist of the upper thread, and a controllable [suction] air *stream* metering [element] *means* connected to said twisting nozzles.

4. Device according to claim 3, including a common line connected to said thread twisting nozzles.

5. Device according to claim 4, wherein said thread cutting means are in the form of a thread cutting mechanism for each of said pneumatic means, and each of said thread twisting nozzles are disposed between said splicing chamber and one of said thread cutting mechanisms.

6. Device according to claim 3, including a fixed proximity switch for controlling said air [suction] *stream* metering [element] *means* in response to motion of said at least one thread regulator, and a timing circuit for simultaneously controlling and setting said air [suction] *stream* metering [element] *means*.

7. Device according to claim 3, including an adjustable proximity switch for controlling said air [suction] *stream* metering [elements] *means* in response to motion of said at least one thread regulator, and a timing circuit for simultaneously controlling and setting said air [suction] *stream* metering [element] *means*.

8. Method according to claim 1, which comprises [initiating the step of] *said* sucking up and securing the newly-formed shorter thread ends during the splicing step.

9. Device according to claim 3, wherein *each* said pneumatic means include means for securing said shortened thread ends.

10. Device according to claim 3, including means for [initiating operation of] *operating* said first and second pneumatic means during splicing.

*11. A method of joining an upper thread to a lower thread in a splicing chamber having a longitudinal groove therein, said method comprising:*

*(a) Inserting said upper thread and said lower thread oppositely in said longitudinal groove in said splicing chamber;*

*(b) clamping said upper thread above said splicing chamber and clamping said lower thread below said splicing chamber;*

*(c) cutting said upper thread below said splicing chamber to form an end of said upper thread and cutting said lower thread above said splicing chamber to form an end of said lower thread; and*

*(d) while said clamping said upper and said lower thread:*

*(i) pneumatically holding and pneumatically untwisting each said thread end by directing compressed air onto each said thread end, and*

*(ii) blowing compressed air into said splicing chamber for joining said upper thread and said lower thread in a splice thereof.*

*12. A method of joining one thread to another according to claim 11 and characterized further in that said pneumatically untwisting comprises removing fibers from said thread ends.*

*13. A method of joining one thread to another according to claim 12 and characterized further in that said pneumatically untwisting comprises applying suction to each said thread end.*

*14. A method of joining one thread to another according to claim 12 and characterized further in that said pneumatically untwisting comprises blowing compressed air against said thread ends.*

*15. A method of joining one thread to another according to claim 12 and characterized further by selectively disposing exchangeable untwisting nozzles above and below said splicing chamber adapted to produce swirling air flows for performing said pneumatically untwisting.*

*16. A method of joining one thread to another according to claim 11 and characterized further by, while said blowing, drawing each said thread end away from the location of its said air stream applying for exposing the thread ends to said blowing.*

*17. A method of joining one thread to another according to claim 11 and characterized further by coordinating the duration of said blowing compressed air with the strength, type and condition of said threads.*

*18. A method of joining one thread to another according to claim 11 and characterized further by providing at least one movable thread regulator for performing said inserting said threads, and conducting said pneumatically holding and untwisting and said blowing in relation to the movement of said thread regulator.*

*19. A device for joining one thread to another thread, comprising:*

*(a) means for arranging respective end portions of said threads adjacent each other;*

*(b) means for clamping each said thread at a spacing from its said end;*

*(c) means for cutting the ends of said threads to form new shorter thread ends;*

*(d) means for applying an air stream to each said new shorter thread end;*

*(e) means for blowing compressed air onto said adjacent thread end portions for joining them in a splice; and*

*(f) control means for actuating said arranging means, said clamping means, said cutting means, said blowing means and said air stream applying means, said control means being operative for actuating said air stream applying means and said blowing means during actuation of said clamping means.*

*20. A device for joining one thread to another thread according to claim 19 and characterized further in that said air stream applying means comprises means for pneumatically untwisting and removing fibers from each said new shorter thread end.*

*21. A device for joining one thread to another thread according to claim 20 and characterized further in that said pneumatically untwisting means comprises means for applying suction to said new shorter thread ends.*

*22. A device for joining one thread to another thread according to claim 20 and characterized further in that said pneumatically untwisting means comprises means for blowing compressed air against said new shorter thread ends.*

*23. A device for joining an upper thread to a lower thread, comprising:*

*(a) a splicing chamber having a longitudinal groove therein and a compressed air inlet channel opening into said groove;*

(b) means for inserting said upper thread and said lower thread oppositely in said longitudinal groove in said splicing chamber;

(c) means for clamping said upper thread above said splicing chamber;

(d) means for clamping said lower thread below said splicing chamber;

(e) means for cutting said upper thread below said splicing chamber to form an end of said upper thread;

(f) means for cutting said lower thread above said splicing chamber to form an end of said lower thread;

(g) means for applying an air stream to said ends of said threads;

(h) means for directing compressed air into said compressed air inlet channel for blowing in said longitudinal groove against said threads to join them in a splice; and (i) control means for actuating each said clamping means, each said cutting means, said air stream applying means and said compressed air directing means, said control means being operative for actuating said air stream applying means and said compressed air directing means during actuation of said clamping means.

24. A device for joining one thread to another according to claim 23 and characterized further in that said air stream applying means comprises means for pneumatically untwisting and removing fibers from said thread ends.

25. A device for joining an upper thread to a lower thread according to claim 24 and characterized further in that said pneumatically untwisting means comprises means for applying suction to said thread ends.

26. A device for joining an upper thread to a lower thread according to claim 24 and characterized further in that said pneumatically untwisting means comprises means for blowing compressed air against said thread ends.

27. A device for joining an upper thread to a lower thread according to claim 24 and characterized further in that said pneumatically untwisting means comprises exchangeable untwisting nozzles above and below said splicing chamber adapted for producing swirling air flows.

28. A device for joining an upper thread to a lower thread according to claim 23 and characterized further in that said thread inserting means comprises at least one thread regulator means movable for inserting said threads in said longitudinal groove, said control means being operative to actuate each said clamping means, each said cutting means, said air stream applying means, and said compressed air directing means in relation to the movement of said thread regulator means.

29. A device for joining an upper thread to a lower thread according to claim 28 and characterized further in that said control means comprises proximity switch means selectively arranged adjacent the path of movement of said thread regulator means for detecting the presence thereof and actuating said air stream applying means and said compressed air directing means thereupon.

30. A device for joining an upper thread to a lower thread according to claim 23 and characterized further in that said control means is arranged for actuating said air stream applying means and said compressed air directing means during movement of said thread regulator means, said thread regulator means operating for drawing each said thread end away from said air stream applying means for exposing said thread ends to said compressed air of said compressed air directing means.

31. A device for joining an upper thread to a lower thread according to claim 23 and characterized further in that said control means comprises valve means associated with said compressed air directing means for coordinating the duration of said compressed air with the strength, type and condition of said threads.

* * * * *